United States Patent
Anderton et al.

(10) Patent No.: US 6,726,293 B2
(45) Date of Patent: Apr. 27, 2004

(54) TRACKED MOBILE MACHINE WITH STAR CARRIER ROLLER AND METHOD OF ASSEMBLY

(75) Inventors: Peter W. Anderton, Peoria, IL (US); Robert E. Brashers, Washington, IL (US); Robert L. Meyer, Metamora, IL (US); Albert L. Woody, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 28 days.

(21) Appl. No.: 10/217,324

(22) Filed: Aug. 12, 2002

(65) Prior Publication Data

US 2004/0026996 A1 Feb. 12, 2004

(51) Int. Cl.[7] .............................................. B62D 55/14
(52) U.S. Cl. ........................ 305/137; 305/139; 305/199; 29/893.1; 474/155
(58) Field of Search ................................ 305/136, 137, 305/124, 195, 199, 139; 474/152, 153, 154, 155, 158, 160; 29/893, 893.1

(56) References Cited

U.S. PATENT DOCUMENTS

| | | | | |
|---|---|---|---|---|
| 205,513 A | * | 7/1878 | Tough | |
| 711,932 A | * | 10/1902 | Bisbee | |
| 2,051,498 A | * | 8/1936 | Short | |
| 2,996,338 A | * | 8/1961 | Hill | |
| 3,787,099 A | * | 1/1974 | Tucker et al. | |
| 3,834,771 A | * | 9/1974 | Firstenberg | |
| 4,081,202 A | * | 3/1978 | Kozuki | |
| 4,083,247 A | | 4/1978 | Umezaki et al. | |
| 4,087,136 A | * | 5/1978 | Boggs et al. | |
| 4,114,958 A | | 9/1978 | Boggs | |
| 4,448,273 A | * | 5/1984 | Barbieri | |
| 4,455,806 A | * | 6/1984 | Rice | 52/732 |
| 5,161,867 A | * | 11/1992 | Johnson | |
| 5,524,813 A | * | 6/1996 | Pease | 228/212 |
| 5,664,621 A | * | 9/1997 | Brophy | 165/8 |
| 5,976,045 A | * | 11/1999 | Young | 474/160 |
| 6,007,166 A | * | 12/1999 | Tucker et al. | 305/135 |
| 6,203,124 B1 | | 3/2001 | Meyer et al. | |
| 6,241,263 B1 | | 6/2001 | Hicks | |
| 6,280,009 B1 | | 8/2001 | Oertley | |

* cited by examiner

Primary Examiner—Russell D. Stormer
(74) Attorney, Agent, or Firm—Liell & McNeil (57) ABSTRACT

Star carrier roller assemblies have been used in certain tracked mobile machines, such as those used in the timber industry, that must operate in cold weather and/or over rough terrain. Due to interaction of the star carrier roller assembly with a track chain assembly, undesirable wear on the star carrier roller assembly occurs. The present invention includes at least one star carrier roller assembly for a tracked mobile machine that limits the wear on the star carrier roller assembly. The star carrier roller assembly includes a carrier roller positioned adjacent to a sprocket having a plurality of teeth. Each tooth includes a tooth width and a tooth angle. A ratio between the tooth width and a difference of a pitch length and a bushing diameter of a track chain assembly is less than 0.3, and the tooth angle is greater than or equal to zero degrees (0°). The present invention further limits the wear of the star carrier roller assembly by maintaining a wear surface on the carrier roller less than three hundred degrees Fahrenheit (300° F.) while attaching the sprocket to the carrier roller.

16 Claims, 5 Drawing Sheets

TABLE 1

|  | EX. 1 | EX. 2 | EX. 3 | EX. 4 | EX. 5 | EX. 6 |
|---|---|---|---|---|---|---|
| TOOTH TIP HEIGHT (mm) | 3.72 | 4 | 4 | 4 | 4 | 4 |
| SPROCKET RADIUS (mm) | 190.5 | 174 | 166 | 161 | 189 | 177 |
| BUSHING RADIUS (mm) | 34.1 | 32 | 29.2 | 29.2 | 36.4 | 32.5 |
| TRANSITIONAL RADIUS (mm) | 35 | 33 | 31 | 31 | 40 | 36 |
| PITCH LENGTH (mm) | 216 | 203 | 190 | 190 | 203 | 190 |
| BUSHING DIAMETER (mm) | 68.1 | 64 | 59.3 | 59.3 | 72.9 | 65 |
| TOOTH WIDTH (mm) (PREFERABLY) | 20 – 38 (26) | 20 – 38 (26) | 20 – 38 (26) | 20 – 38 (26) | 20 – 38 (26) | 20 – 38 (26) |
| TOOTH WIDTH/ PITCH LENGTH-BUSHING DIAMETER (PREFERABLY) (mm) | .14 – .26 (.18) | .14 – .27 (.19) | .15 – .29 (.20) | .15 – .29 (.20) | .15 – .29 (.20) | .16 – .3 (.21) |
| TOOTH ANGLE (°) | ≅ 12 | ≅ 12 | ≅ 12 | ≅ 12 | ≅ 12 | ≅ 12 |

TRACKED MOBILE MACHINE WITH STAR CARRIER ROLLER AND METHOD OF ASSEMBLY

TECHNICAL FIELD

The present invention relates generally to tracked mobile machines, and more specifically to a star carrier roller assembly for a tracked mobile machine and a method for assembling the star carrier roller assembly.

BACKGROUND

Several tracked mobile machines include a rotating endless track chain. An upper portion of the track chain is guided and supported by carrier rollers and a bottom portion is guided by bottom rollers. Often, the bottom rollers and the carrier rollers both include a cylindrical body that rotates as the track chain crosses over them. Some of these tracked mobile machines, such as those used in the timber industry, must be able to operate during relatively cold weather and/or when mud or other undesirable substances have attached to the carrier rollers. During cold weather or when mud or other undesirable substance attach to the carrier rollers, there is insufficient friction between the carrier rollers and the rotating track chain to also rotate the carrier rollers. Thus, the track chain will slide over the stationary carrier rollers, resulting in wear on the carrier roller. The wear causes the carrier roller to lose its circular shape, making it even more difficult for the passing track chain to rotate the carrier roller. The end result is a necessity to prematurely replace the worn carrier roller.

Over the years, engineers have developed engagement apparatuses that can ensure rotation of carrier rollers attached to these tracked mobile machines operating in relatively harsh conditions, such as tracked mobile machines used in the timber industry. For instance, carrier rollers, such as those shown in U.S. Pat. No. 6,203,124 B1, issued to Meyer et al., on Mar. 20, 2001, include driving pins, arranged equidistantly on a coaxial circumferential circle. A driving lug of the track chain engages between two of the driving pins to ensure that the roller carrier will rotate with the rotating track chain. Although the Meyer carrier roller does engage the track chain such that it ensures rotation of the carrier roller, assembly of the Meyer carrier roller may be time consuming and costly. Further, the Meyer carrier roller does not engage all types of track chains, such as track chains that do not include protruding driving lugs. Thus, use of the Meyers strategy would necessitate costly modifications to existing track chains.

Another approach known in the art to ensuring rotation of the carrier roller is to attach a sprocket to the existing carrier rollers. A sprocket attached to a carrier roller is referred to as a star carrier roller assembly. The sprockets generally include five teeth that engage the track chain as it rotates. When the teeth engage the track chain, the carrier roller attached to the sprocket must also rotate. Although the sprocket, without the carrier roller, would engage the track chain, the interactions of the track chain and the sprocket, alone, prevents smooth operation of the tracked mobile machine. Although these star carrier roller assemblies are shaped to ensure rotation of the carrier rollers, there is room for improvement in the design of the star carrier roller assemblies.

A typical track chain includes an endless chain of connected link assemblies. Generally, each link assembly includes a right link and left link and a bushing perpendicularly attached to both links. The links travel across a wear surface of the carrier roller, and the teeth engage the bushing. Each time the tooth of the sprocket comes in contact with the bushing, the bushing may rub against the tooth, causing sprocket and/or bushing wear. In addition, because the roller has a smaller radius than the sprocket, when the tooth of the sprocket comes in contact with the bushing, the roller will be rotating slower than the track chain. Thus, the contact between the tooth and the track chain will cause the track chain to momentarily jerk. The wear surface of the roller that is in contact with the track chain when the jerking movement occurs may develop a flat spot due to this wearing.

Those skilled in the art will appreciate, that although there may always be some wear occurring between the track chain and the star carrier roller assembly, the geometry of the sprocket can exacerbate the wear on the roller, the bushing, and the sprocket. For instance, one manufacturer has developed a star carrier roller assembly that includes relatively short and wide teeth, which can cause unacceptable sprocket and bushing wear. In addition, this known design includes a relatively steep slope on the teeth, resulting in the bushing sliding down the tooth, which further increases bushing and sprocket wear. Thus, although this design may decrease the wear on the roller carrier by attaching the sprocket, it may lead to premature wear of the sprocket and the bushing.

Contrary to the previous approach, another manufacturer has designed a star carrier roller assembly that includes relatively lengthy, narrow teeth that engage the track chain. There is a larger distance between the sprocket teeth than there is with the previously discussed design, resulting in less contact between the bushing and the sprocket. However, the teeth of the new design have a negative slope, meaning that the teeth get slightly wider as they extend from the carrier roller. In addition, this star carrier roller assembly has a relatively long tooth tip, meaning that the tip of the tooth is significantly rounded. Although this design may reduce the wear on the sprocket and the bushing of the track chain, the negative slope and the relatively rounded tooth tip of the star carrier roller can result in premature carrier roller wear.

The life of a carrier roller that suffers from excessive wear may be shortened by forty to sixty percent. Further, wear can cause the respective component to function improperly. In addition to the wear, the attachment of the sprockets to the carrier roller causes the tracked mobile machine to operate less smoothly. Thus, some star carrier roller assemblies limit bushing and sprocket wear, but result in increased carrier roller wear and excessive vibrations. On the other hand, other star carrier roller assemblies result in relatively smooth operation and less carrier roller wear, but increase bushing and sprocket wear.

Moreover, there is room for improvement in the method of assembling star carrier roller assemblies. Often when star carrier roller assemblies are manufactured, the sprocket is attached to the previously assembled carrier roller. During assembly of the carrier roller, bearings are mounted inside a cylindrically shaped body comprised of tempered steel, and a rubber seal is attached to prevent mud and other undesirable substances from entering the body and interfering with the bearings. When the sprocket is welded to the hardened steel body, the heat created by the welding can temper the steel body, thereby reducing the roller's hardness and subjecting it to hastened wear. Further, during the welding of the sprocket, the heat can affect the rubber comprising the seals, and thereby damaging the seals. Although prior to welding the sprocket onto the carrier rollers body, the seals could be removed from the body, this process increases the costs of manufacturing the star carrier roller assemblies.

The present invention is directed to overcoming one or more of the problems set forth above.

SUMMARY OF THE INVENTION

In one aspect of the present invention, a tracked mobile machine includes a track chain assembly attached to a machine body and including a pitch length and a bushing diameter. At least one star carrier roller assembly is attached to the machine body and includes a sprocket positioned adjacent to a carrier roller. The carrier roller has a cylindrical wear surface. The sprocket has a plurality of teeth, and each tooth has a tooth width and a tooth angle. The tooth angle is greater than or equal to zero degrees (0°). A ratio between the tooth width and a difference of the pitch length and the bushing diameter is less than 0.3.

In another aspect of the present invention, a star carrier roller assembly includes a carrier roller with a cylindrical wear surface and a sprocket that is positioned adjacent to the carrier roller. The sprocket has a plurality of teeth, and each tooth includes a tooth angle that is equal to or greater than zero degrees (0°). The sprocket has a plurality of non-contact zones, each of which define a non-contact zone angle. The non-contact zones are separated from a plurality of contact zones, each of which define a contact zone angle. The contact zone angle is less than the non-contact zone angle.

In yet another aspect of the present invention, a star carrier roller assembly is assembled by maintaining a wear surface on a carrier roller less than three hundred degrees Fahrenheit (300° F.) while attaching a sprocket to the carrier roller.

DETAILED DESCRIPTION

Figure 1:
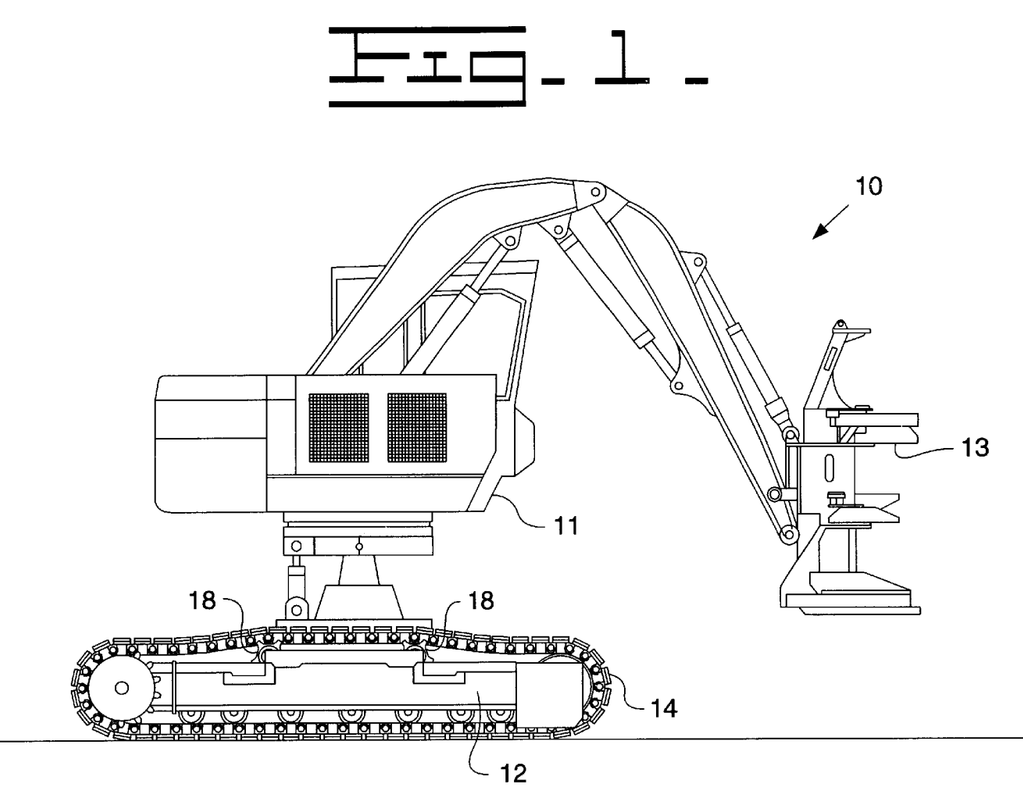
FIG. 1 is a perspective view of a tracked mobile machine, according to the present invention.

Referring to FIG. 1, there is shown a side view of a tracked mobile machine 10, according to the present invention. Although the tracked mobile machine 10 is illustrated as a mobile machine used for timbering, it should be appreciated that the mobile machine could be any type or size of tracked-type machine, such as an excavator. The tracked-type mobile machine 10 includes a machine body 11 to which at least one implement 13, such as a claw used for timbering, is attached. Further, a tracked undercarriage 12 is attached to the body Referring to FIG. 2, there is shown a side view of the undercarriage 12 of the tracked-type mobile machine 10 of FIG. 1. The undercarriage 12 includes a support frame 15 and an endless track chain assembly 14 that runs in a loop over a drive sprocket 16 and an idler wheel 17. A plurality of track rollers 19 are rotatably mounted on to a bottom side of the support frame 15 and guide the chain as it runs across the ground. Each track roller 19 includes a cylindrical body comprised of tempered steel and in which bearings are mounted. At least one seal is housed in the cylindrical body in order to prevent mud and other undesirable substances from entering the body and affecting the bearings and to prevent oil from leaking from the body. At least one star carrier roller assembly 18 is rotatably mounted to an upper side of the support frame 15 in order to support the weight of the track chain as it runs over the top of the loop. Although the present invention is illustrated as including two star carrier roller assemblies 18, it should be appreciated that the tracked mobile machine 10 can include any number of star carrier roller assemblies. The star carrier roller assemblies 19 include a carrier roller 20 to which a sprocket 21 is preferably attached. The sprocket 21 preferably is star-shaped and includes a plurality of teeth 23. Although the preferred number of teeth 23 is five, it should be appreciated that the number of teeth 23 could vary depending on the diameter of the carrier roller and other factors known in the art. For instance, star carrier rollers 20 are identical to bottom rollers 19, except for the inclusion of sprockets 21. Because of manufacturing quantity considerations, star carrier rollers are preferably made by modifying existing bottom roller assemblies. Nevertheless, the present invention contemplates star carrier rollers that share little in common with associated bottom roller on the same machine. In the illustrated tracked mobile machine 10, if there were less than five teeth 23, the space between a pair of teeth may be too large to properly engage the track chain assembly 14. Further, if there were more than five teeth 23, there may be an increase in wear to the carrier roller 20 due to the increased rubbing between the carrier roller 20 and the track chain assembly 14.

Figure 2:
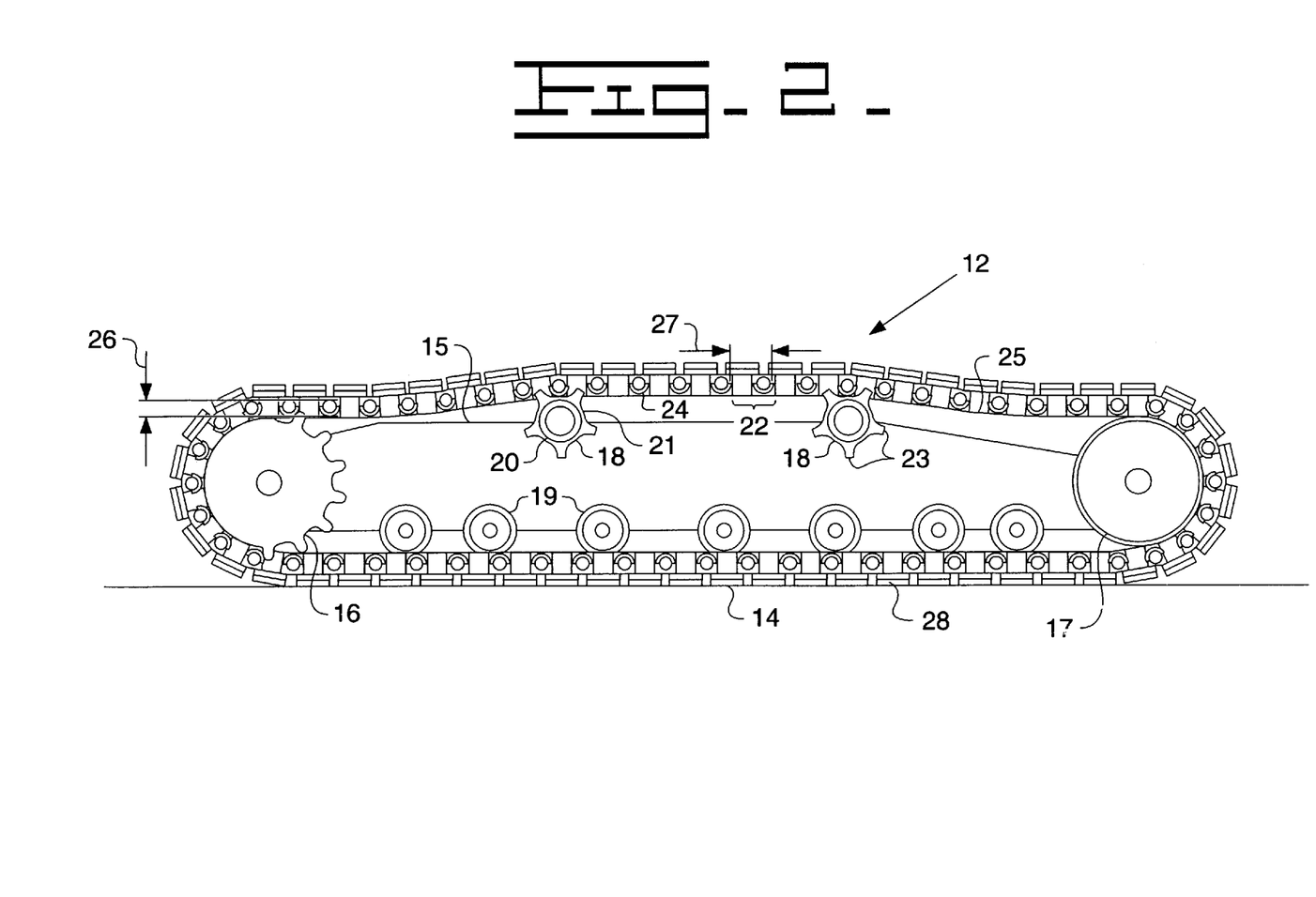
FIG. 2 is a side diagrammatic view of an undercarriage of the tracked mobile machine of FIG. 1.

As the track chain assembly 14 runs over the star carrier roller assembly 18, the sprocket 21 engages the track chain assembly 14 to ensure that the carrier roller 20 remains rotating even in cold weather and/or when mud has attached itself to the carrier roller 20. The track chain assembly 14 includes an endless series of connected link assemblies 22. A link assembly 22 preferably includes a right link and a left link. A bushing 24 is attached to the right link and the left link, and extends perpendicularly between the links. A shoe 28 is attached to each link assembly 22 to support the weight of the machine and provide traction when in contact with the ground. The bushing 24, the left link, and the right link define a link box opening 25, which is the difference between the pitch length and the bushing diameter. This difference defines the gap that receives the teeth 23 of the star carrier roller assembly 18. The bushing 24 includes a bushing diameter 26 and a bushing radius 26a being half of the bushing diameter 26. The track chain assembly 14 includes a pitch length 27. Those skilled in the art will appreciate that the pitch length 27 is the distance between bushing centers. For instance, the pitch length 27 can be determined by measuring the distance between a center one bushing 24 to the center of the adjacent bushing. The teeth 23 of the sprocket 21 engage the track chain assembly 14 by contacting the bushing 24.

Figure 3A:
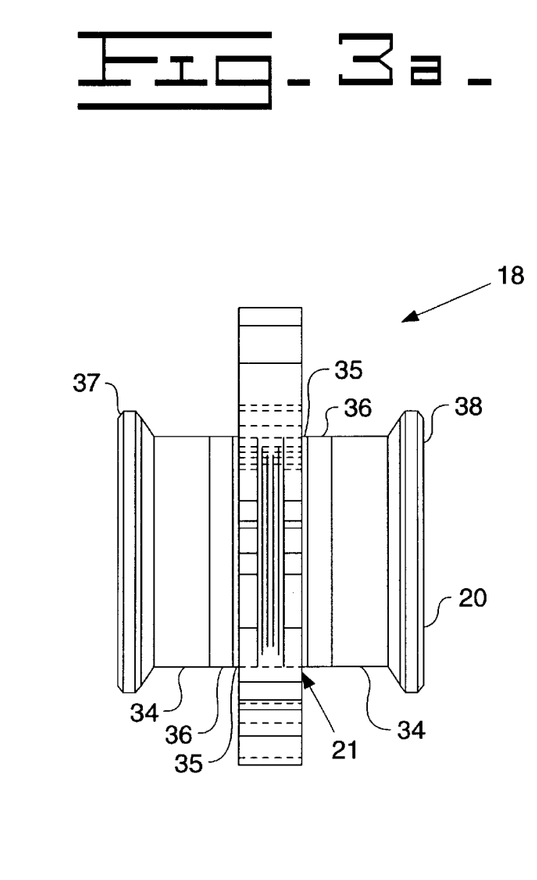
FIG. 3a is a top diagrammatic view of a star carrier roller assembly included within the undercarriage of FIG. 2.
Figure 3B:
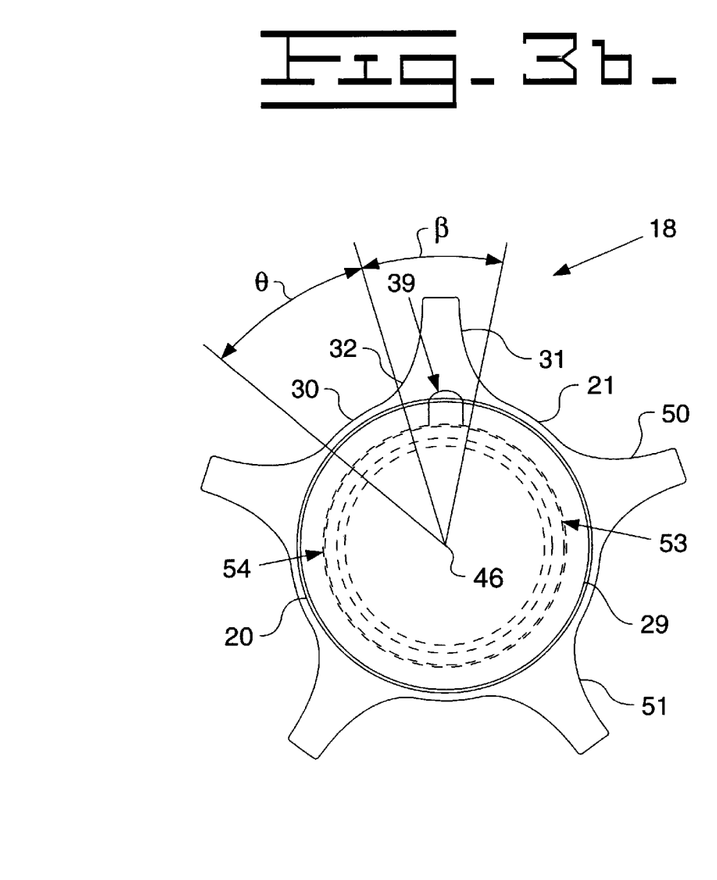
FIG. 3b is a side diagrammatic view of the star carrier roller assembly included within the undercarriage of FIG. 2.

Referring to FIGS. 3a and 3b, there are shown a top view and a side view, respectively, of one of the star carrier roller assemblies 18 of FIG. 2. Although the following description is for one of the two star carrier roller assemblies 18, it should be appreciated that the design for both star carrier roller assemblies 18 is the same. Referring specifically to FIG. 3a, although the sprocket 21 and the carrier roller 20 can be manufactured as one component, such as by casting, the sprocket 21 is preferably attached to the previously assembled carrier roller 20. The sprocket 21 separates a first side 37 of the carrier roller 20 from a second side 38 of the carrier roller 20. On each side 37 and 38 of the carrier roller 20, the carrier roller 20 includes a cylindrical wear surface 34. The cylindrical wear surface 34 is the surface of the carrier roller 20 which makes contact with the links of the link assembly 22 as the link assembly passes over the star carrier roller assembly 18. The wear surface 34 is preferably comprised of hardened steel such that it is of sufficient hardness to accept the wear from the passing link assembly 22. On the first side 37 and the second side 38 of the carrier roller 20, the cylindrical wear surface 34 is separated from a fillet weld surface 35 by a carrier roller non-contact zone 36. The fillet width 35 is formed from attaching the sprocket 21 to the carrier roller 20. A width of the carrier roller non-contact zone 36 is preferably at least three times that of fillet width 35. Although the fillet width 35 and the carrier roller non-contact zone 36 could be of varying width depending on the size of the star carrier roller assembly 18, the fillet width 35 is illustrated as about six millimeters (6 mm) and the carrier roller non-contact zone 36 is illustrated as about 20 millimeters (20 mm). This separation between the weld zone and the contact zone facilitates in limiting heat transfer to the tempered contact zone during the welding attachment procedure.

Referring specifically to FIG. 3b, the carrier roller 20 is similar to the track roller 19 in that it includes a cylindrical carrier roller body 29 comprised of hardened steel in which bearings are mounted. The carrier roller body 29 is sealed with at least one rubber seal 39 in order to keep debris and mud from entering the body and to prevent the lubricating oil from leaking from the body 29. Although the present invention illustrates the track rollers 19 having the similar design as the carrier roller 20, it should be appreciated that track rollers 19 could be of a different design than the carrier rollers 18. The sprocket 21 is made up of two sprocket pieces 50 and 51 that are attached together in a conventional manner, such as by welding at weld locations 53 and 54. Those skilled in the art will recognize that sprocket 21 could be one piece component in other applications without departing from the present invention. The sprocket 21 attached to the carrier roller 20 includes a plurality of non-contact zones 30. Each non-contact zone 30 defines a non-contact zone angle ($\theta$). The non-contact zone 30 is an area of the sprocket 21 in which the bushing 24 does not make contact. The non-contact zone angle ($\theta$) is the angle between two lines, each extending from a center 46 of the star carrier roller assembly 18 through both outer edges of the non-contact zone 30. The plurality of non-contact zones 30 are separated from a plurality of contact zones 31, each contact zone 31 defining a contact zone angle ($\beta$). The contact zone 31 is an area of the sprocket 21 in which the bushing 24 makes contact with the sprocket 21. The contact zone angle ($\beta$) is the angle between two lines, each extending from the center 46 of the star carrier roller assembly 18 through both outer edges of the contact zone 31. The contact zones 31 include the teeth 23 and a portion of a transition radius area of the sprocket 21. Each tooth 23 is separated from the non-contact zone 30 by a transitional zone 32. The transitional zone 32 is a curved portion of the sprocket that aids in transitioning the bushing 24 from the non-contact zone 30 to teeth 23.

Figure 4:
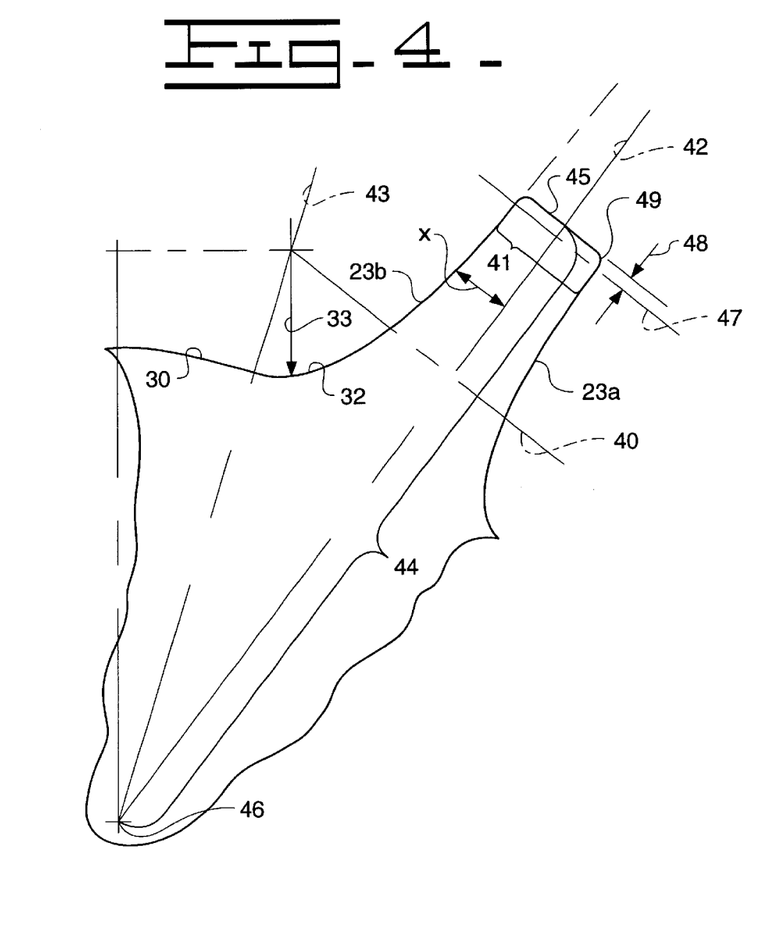
FIG. 4 is a representation of geometric dimensions of a sprocket of the star carrier roller assembly of FIG. 2; and Table I is a list of specific geometric dimensions for six examples of the star carrier roller assembly of FIG. 2.

Referring to FIG. 4, there is shown geometrical dimensions of the tooth 23 of the star carrier roller assembly 18 of FIG. 2. Each tooth 23 includes a first side 23a and a second side 23b. Each tooth 23 of the sprocket 21 also includes a tooth tip 45 that has a tooth tip height 48. The tooth tip 45 is that portion of the tooth that is above an imaginary tooth tip line 47. The tooth tip line 47 is parallel to a top edge of the tooth 23 and passes through the tangency points of lines drawn along both sides 23a and 23b of the tooth 23 and corner radi 49 of the tooth tip 45. Thus, the tooth tip 45 includes the rounded portion at the end of each tooth 23. Those skilled in the art will appreciate that a bevel or other geometric transition could be substituted for corner radius 49. The sprocket 21 has a radius 44 that is the distance between the center point 46 of the sprocket 21 to a radial tip 45 of the tooth 23. It should be appreciated that the center 46 of the star carrier roller assembly 18 is the same center 46 of the sprocket 21. The height 48 of the tooth tip 45 is preferably less than ten percent (10%) of the sprocket radius 44.

Each tooth 23 of the star carrier roller assembly 18 includes a tooth width 41 being the width of the tooth 23 along the tooth tip line 47. The tooth tip line 47 is parallel to a top edge of the tooth 23 and passes through the tangency points of lines drawn along both sides 23a and 23b of the tooth 23 to the corner radii 49 of the tooth tip 45. The distance between the first side 23a of the tooth 23 and the second side 23b of the tooth 23 on the tooth tip line 47 is the tooth width 41. In addition, each tooth 23 of the star carrier roller assembly 18 includes a tooth angle (x). The tooth angle (x) is illustrated by intersecting a center line 42 of the tooth 23 and the line drawn down either side 23a or 23b of the tooth 23. The tooth angle (x) is the included angle between the center line 42 of the tooth 23 and the line drawn down either side 23b or 23a of the tooth 23. The transitional zone 32 includes a transitional radius 33. The transitional radius 33 is the radius of curvature in the transitional zone 32. The transitional radius 33 is preferably equal to or greater than the bushing radius 26a. By making the transitional radius 33 slightly larger than the bushing radius 26a, the bushing 24 can transition from the non-contact zone 30 to the contact zone 31 more smoothly. Most of the transition zone 32 is also included in the contact zone, but a small portion is included in the non-contact zone 30.

Referring to Table I, there is listed specific geometrical dimensions of six examples of the star carrier roller assembly 18 of FIG. 2. Table I illustrates the geometric dimensions that are consistent between six examples of the present invention. In all six examples, the tooth width 41 can vary between 20 mm and 38 mm. Thus, in all six examples, the ratio between the tooth width 41 and a difference between the pitch length 27 (shown in FIG. 2) and the bushing diameter 26 (shown in FIG. 2) is equal to or less than 0.3. Preferably, the tooth width 41 is 26 mm, but could vary from 20 to 38 mm in the illustrated examples. Using the preferred tooth width 41 of 26 mm, in all six examples, the ratio between the tooth width 41 and the difference between the pitch length 27 and the bushing diameter 26 is about 0.2, specifically between 0.18 and 0.22, but this ratio could range from 0.14 to 0.3, depending on tooth width. The tooth angle (x) of each tooth 23 of the sprocket 21 is equal to or greater than 0°. However, in all six examples, the tooth angle (x) is preferably about 12°, which means 12° plus or minus 2°. Further, in all six examples, the transitional radius 33 is preferably equal to or less than 115% of the bushing radius 26a. In all six examples, the tooth tip height 48 is preferably less than 10% of the sprocket radius 44.

Industrial Applicability

Referring to FIGS. 3a and 3b, there is shown the front view and the side view of the star carrier roller assembly 18 of FIG. 2, respectively. Although there could be any number of star carrier roller assemblies 18, the present invention will be described for only one star carrier roller assembly 18. Those skilled in the art will appreciate that the assembly and operation of the star carrier roller assembly 18 is similar for each star carrier roller assembly 18. Those skilled in the art will also appreciate that there are varying types of tracked mobile machines with various functions. Some tracked mobile machines may use only carrier rollers 20 to support and guide a track chain over the top part of the loop. However, other tracked mobile machines, such as those used in the timber industry, operate over relatively rough terrain which may result in undesirable substances becoming attached to the undercarriage 12. The attached substances may inhibit rotation of the carrier rollers 20. Thus, tracked mobile machines that do operate under these conditions require a sprocket 21 being attached to the carrier roller 20 in order to ensure rotation of the carrier roller 20.

Although the star carrier roller assembly 18 could be manufactured as a new component replacing the carrier roller 20 used in the tracked mobile machine 10, it is preferred that the sprocket 21 is attached to the existing carrier roller 20. In order to attach the sprocket 21 to the carrier roller 20, the sprocket 21 is preferably welded to the carrier roller 20 while maintaining the cylindrical wear surface 34 of the carrier roller 20 less than 300° F. The cylindrical wear surface 34 is comprised of hardened steel. If the cylindrical wear surface 34 exceeds 300° F., the hardness of the tempered steel comprising the wear surface 34 may be undermined by the heat, leading to excessive carrier roller 20 wear. In addition, the sprocket 21 is preferably welded to the carrier roller 20 while maintaining the seals 39 of the carrier roller 20 at less than 180° F. Because the seals 39 are generally made from rubber, if the seals 39 are heated to over 180° F., they may begin to melt and/or deform which would allow the oil within the body 29 of the carrier roller 20 to leak resulting in excessive bearing wear.

In order to maintain the seals 39 and the wear surface 34 below the required temperatures, the sprocket 21 is preferably skip welded to the carrier roller 20. Skip welding is a process in which a limited section, approximately one inch, of the sprocket 21 is welded to a first end of the carrier roller 20. The carrier roller 20 is then rotated so that a limited section, approximately one inch, of the sprocket 21 can be welded to a second end of carrier roller 20. The carrier roller 20 is again rotated to the first end so that a second limited section of the sprocket 21 can be welded. However, the second limited section will preferably be spaced approximately an inch from the first welding. Thus, the welding will resemble a dashed line. The process will be repeated on both sides of the carrier roller 20 until the sprocket 21 is sufficiently welded onto the carrier roller 20. Because the process limits the heat transferred to one portion of the carrier roller 20, and rather spreads the heat evenly over the welded surface 35, the heat traveling to the seals 39 and the wear surface 34 is limited. Further, because the welded surface 35 is separated from the cylindrical wear surface 34 by the carrier roller non-contact zone 36 that is three times the welded surface 35, the heat generated by the welding should dissipate below 300° F. and 180° F. by the time it reaches the wear surface 34 and the seal 39, respectively. Although the undermining of the heat treatment of the carrier roller body 29 may occur, it will occur in the carrier roller non-contact zone 36 which does not make contact with the passing links. Moreover, because the sprocket 21 is simply engaging the track chain assembly 14, there is not an excessive amount of stress being placed on the welded surface 35 between the sprocket 21 and the carrier roller 20. Thus, the heat generated by the welding can be further limited by having a weld width that is less than 25% of the sprocket 21 thickness.

Referring to FIGS. 2–4 and Table I, it should be appreciated that the operation of the star carrier roller assembly 18 will be described for one link assembly 22 passing over the star carrier roller assembly 18. However, it should be appreciated that the star carrier roller assembly 18 similarly engages each link assembly 22 as it passes. Once the star carrier roller assembly 18 is assembled, it is rotatably attached to the support frame 15 of the undercarriage 12. As the tracked mobile machine 10 is being operated and the track chain assembly 14 rotates in the loop over the support frame 15, the star carrier roller assembly 18 will guide and support the weight of the track chain assembly 14. The teeth 23 of the sprocket 21 will engage the track chain assembly 14, ensuring the rotation of the star carrier roller assembly 18. As the link assembly 22 slides over the star carrier roller assembly 18, the right link and the left link will slide-along the cylindrical wear surface 34 of the carrier roller 20. Because the wear surface 34 is comprised of heat treated steel, the wear surface 34 is sufficiently hard to tolerate the wear between the passing link assembly 22 and the carrier roller 20. In ideal conditions, the passing link assembly 22 will cause the star carrier roller assembly 18 to rotate, and the tooth 23 behind the passing bushing 24 will be received in the link box opening 25 also behind the passing bushing 24. As the tooth 23 enters the link box opening 25, the bushing 24 will be passing over the non-contact zone 31 of the sprocket 21. Thus, the bushing 24 may not be in contact with the sprocket 21.

Because the tooth width 41 is relatively narrow, the tooth 23 can easily fit in the link bore 25 without the surrounding bushings making contact with the adjacent teeth 23, which would cause wear to the sprocket 21 and the bushings 24. The tooth width 41 is preferably 26 mm in all six examples. However, the tooth width 41 could be any width between 20–38 mm. Beyond 38 mm, the wear to the sprocket 21 and the bushing 24 may increase, and below 20 mm, the inevitable wear on the tooth 23 could result in premature breakage or faulty performance of the tooth 23. As the bushing 24 continues to travel, it will enter the transitional zone 32. Because the transitional radius 33 is slightly larger than the bushing radius 26a, the bushing 24 will have space to smoothly slide from the non-contact zone 31 to the contact zone 30, being the tooth 23 in front of the bushing 24. If the transitional radius 33 were less than the bushing radius 26a, the bushing 24 may dig into the surface of the sprocket 21 as it moves into contact with the tooth 23 in front of the bushing 24. This would lead to bushing 24 and sprocket 21 wear.

As the star carrier roller assembly 18 rotates, the bushing 24 will make contact with the second side 23b of the tooth 23 in front of the bushing 24. Because the star carrier roller assembly 18 has a smaller radius than the effective radius of the moving track chain assembly 14, the star carrier roller assembly 18 may be rotating at a slower speed than the track chain assembly 14 when the bushing 24 makes contact with the tooth 23 in front of it. The differing speeds may cause the bushing 24, and the link assembly 22, to jerk, resulting in the right and left link rubbing against the wear surface 34 of the carrier roller 20. Over time, this rubbing may cause a flat spot on the carrier roller 20, leading to a shorter life of the carrier roller 20. Generally, the longer the bushing 24 stays in contact with the tooth 23, the less sliding and wear on the carrier roller 20. Thus, the tooth 23 is relatively long in order to stay in contact with the bushing 24, and thus, reduce carrier roller 20 wear. Referring to the six examples in Table I, the tooth height which is defined by the sprocket radius 44 is as large as it can be while still clearing the shoe 28.

Further, the fact that the tooth tip height 48 is less than 10% of the sprocket radius 44 illustrates that the tooth tip 45 is not excessively rounded. Thus, the tooth tip 45 can prolong the contact of the tooth 23 with the bushing 24.

As the bushing 24 travels over the tooth 23, the tooth angle (x) is important. If the tooth angle (x) is too large, resulting in a relatively steep slope, the bushing 24 will slide down the tooth 23, resulting in sprocket 21 and bushing 24 wear. Further, if the tooth angle (x) is negative, meaning that the tooth 23 is wider near its tip 45 than near the tooth base, the bushing 24 will not slide smoothly over the tooth tip 45, resulting in rubbing of the link assembly 22 on the cylindrical wear surface 34 and increased wear on the carrier roller 20. Thus, the angle of approximately 12° results in the bushing 24 sliding relatively smoothly over the tooth 23.

In situations when there are undesirable substances attached to the carrier roller 20 and/or the weather is cold, the carrier roller 20 will still rotate because of the attached sprocket 21. However, it should be appreciated that the resistance of the star carrier roller assembly 18 to rotating may cause additional wear to the star carrier roller assembly 18.

The present invention is advantageous because it limits roller carrier 20 wear, bushing 24 wear, and sprocket 21 wear to acceptable levels, while also providing the tracked mobile machine 10 with a relatively smooth operation. Roller carrier 20 wear is limited in the present invention by the height of the sprocket 21. Because the sprocket radius 44 has as large a radius as it can be while still clearing the shoe 28 of the link assembly 22, the bushing 24 and the tooth 23 can be in contact for a longer period of time. The longer the tooth 23 remains in contact with the bushing 24, the smoother the movement of the track chain assembly 14 and the less rubbing between the links and the carrier roller 20. Further, the carrier roller 20 wear is limited by the tooth angle (x) being at least 0°. Because there is a slight slope to the tooth 23, the bushing 24 can slide smoothly over the tooth 24.

Further, the narrow tooth width 41 of the present invention limits the sprocket 21 wear and the bushing 24 wear. Because the tooth width 41 is relatively narrow, the tooth 23 can positively engage the link bore 25 without contacting the bushing 24 and causing excessive scraping between the sprocket 21 and the bushing 24. Thus, the sprocket 21 and bushing 24 will not prematurely wear. Moreover, the wear on the sprocket 21 and the bushing 24 is limited by the transitional radius 33 is slightly larger than the bushing radius 26a. This allows space for the bushing 24 to transition to the contact zone 30, being the tooth 23, without digging into the sprocket 21. In addition, the wear on the bushing 24 and the sprocket 21 is limited by the tooth angle (x) being about 12°. If the tooth angle (x) were too large, resulting in a steep slope, the bushing 24 would slide down the tooth 23, resulting in both wear on the bushing 24 and the tooth 23. Thus, although the present invention may not limit one type of wear to an optimal level, the present invention prolongs the overall life of the star carrier roller assembly 18 and track bushings by limiting all three types of wear (roller, tooth and bushing wear) to acceptable levels.

Further, the present invention is advantageous because it provides a relatively convenient and inexpensive method of assembling of the star carrier roller assembly 18 without compromising the cylindrical wear surface 34 and the seals 39. Rather than manufacturing a new assembly including a sprocket 21 and a carrier roller 20, the sprocket 21 is attached to the existing carrier roller 20. Because the expense of a new production line is eliminated, it is feasible to produce star carrier roller assemblies 18 for only the tracked mobile machines 10 that require them, such as tracked mobile machines used in the timber industry. Moreover, by limiting the heat transferred by the welding, the sprocket 21 can be welded onto the carrier roller 20 without undermining the seals 39 and the tempering of the cylindrical wear surface 34. Less heat will be transferred to the wear surface 34 and the seals 39 by limiting the welded surface 35. The welded surface 35 can be limited without comprising the integrity of the attachment between the sprocket 21 and the carrier roller 20. In addition, placement of the cylindrical wear surface 34 and the seals 39 at a significant distance from the sprocket 21 limits the heat that can be transferred to the cylindrical wear surface 34 and the seals 39. Lastly, by using the process of skip-welding, the heat of the welding is not concentrated in one area of the carrier roller 20 for a prolonged time period. Thus, the heat transferred to the cylindrical wear surface 34 and the seals 39 is limited. Therefore, the sprocket 21 can be welded to the carrier roller 20 after the carrier roller 20 has been completely assembled without reducing the hardness of the wear surface 34 or the form of the seals 39.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

LIST OF ELEMENTS
TITLE: TRACKED MOBILE MACHINE WITH STAR CARRIER ROLLER AND METHOD OF ASSEMBLY
FILE: 02-429
10. Tracked Mobile Machine
11. Body
12. Undercarriage
13. Implement
14. Track Chain Assembly
15. Support Frame
16. Tumbler
17. Idler Wheel
18. Star Carrier Roller Assembly
19. Plurality of Track Rollers
20. Carrier Roller
21. Sprocket
22. Link Assembly
23. Plurality of Teeth
23a. First Side
23b. Second Side
24. Bushing
25. Link Box Opening
26. Bushing Diameter
26a. Bushing Radius
27. Pitch Length
28. Shoe
29. Carrier Roller Body
30. Non-contact Zone
31. Contact Zone
32. Transitional Zone
33. Transitional Radius
34. Cylindrical Wear Surface
35. Fillet Weld Surface
36. Carrier Roller Non-contact Zone
37. First Side
38. Second Side
39. Seals
40. Transitional Zone Line
41. Tooth Width
42. Center Line
43. Non-contact Zone Line
44. Sprocket Radius
45. Tooth Tip
46. Center
47. Tooth Tip Line 48. Tooth Tip Height
49. Corner radius
50. Sprocket Piece
51. Sprocket Piece
53. Weld Location
54. Weld Location
θ. Non-contact Zone Angle
β. Contact Zone Angle
x. Tooth Angle

TABLE I

|  | Ex. 1 | Ex. 2 | Ex. 3 | Ex. 4 | Ex. 5 | Ex. 6 |
|---|---|---|---|---|---|---|
| Tooth Tip Height (mm) | 3.72 | 4 | 4 | 4 | 4 | 4 |
| Sprocket radius (mm) | 190.5 | 174 | 166 | 161 | 189 | 177 |
| Bushing radius (mm) | 34.1 | 32 | 29.2 | 29.2 | 36.4 | 32.5 |
| Transitional radius (mm) | 35 | 33 | 31 | 31 | 40 | 36 |
| Pitch length (mm) | 216 | 203 | 190 | 190 | 203 | 190 |
| Bushing diameter (mm) | 68.1 | 64 | 59.3 | 59.3 | 72.9 | 65 |
| Tooth width (mm) (Preferably) | 20–38 (26) | 20–38 (26) | 20–38 (26) | 20–38 (26) | 20–38 (26) | 20–38 (26) |
| Tooth width/ Pitch length- Bushing diameter (Preferably) (mm) | .14–.26 (.18) | .14–.27 (.19) | .15–.29 (.20) | .15–.29 (.20) | .15–.29 (.20) | .16–.3 (.21) |
| Tooth angle (°) | ≅12 | ≅12 | ≅12 | ≅12 | ≅12 | ≅12 |

What is claimed is:

1. A tracked mobile machine comprising:
a machine body;
a track chain assembly attached to the machine body and including a pitch length and a bushing diameter;
at least one star carrier roller assembly attached to the machine body and including a carrier roller and a sprocket being positioned adjacent to the carrier roller;
the carrier roller including a cylindrical wear surface, and the sprocket including a plurality of teeth, each tooth including a tooth width and a tooth angle;
the ratio between the tooth width and a difference of the pitch length and the bushing diameter being less than 0.3; and
the tooth angle being greater than or equal to zero degrees (0°).

2. The tracked mobile machine of claim 1 wherein the ratio is about 0.2.

3. The tracked mobile machine of claim 1 wherein the tooth angle being about twelve degrees (12°).

4. The tracked mobile machine of claim 1 wherein the sprocket has a sprocket radius, and each tooth includes a tooth tip height; and
the tooth tip height being less than ten percent (10%) of the sprocket radius.

5. The tracked mobile machine of claim 1 wherein the sprocket includes a plurality of non-contact zones, each non-contact zone being separated from each tooth by a transition radius; and
the transitional radius being at least one of equal to and greater than a bushing radius, and being less than one hundred and fifteen percent (115%) of the bushing radius.

6. The tracked mobile machine of claim 1 wherein the cylindrical wear surface of the carrier roller being separated from a welded surface by a carrier roller non-contact zone; and
a width of the carrier roller non-contact zone being at least three times a fillet weld width.

7. The tracked mobile machine of claim 2 wherein the tooth angle being about twelve degrees (12°); and
the sprocket includes a plurality of non-contact zones, each non-contact zone being separated from each tooth by a transitional radius; and the transitional radius being at least one of equal to and greater than a bushing radius, and being less than one hundred and fifteen percent (115%) of the bushing radius.

8. A star carrier roller assembly comprising:
a carrier roller including a cylindrical wear surface;
a sprocket being positioned adjacent to the carrier roller and including a plurality of teeth, each tooth including a tooth angle; and
the tooth angle being equal to or greater than zero degrees (0°); and
the sprocket including a plurality of non-contact zones that define a non-contact zone angle, and separated from a plurality of contact zones, each defining a contact zone angle; and the contact zone angle being less than the non-contact zone angle.

9. The star carrier roller assembly of claim 8 wherein the tooth width angle being about twelve degrees (12°).

10. The star carrier roller assembly of claim 8 wherein each tooth includes a tooth tip height and the sprocket has a sprocket radius; and
the tooth tip height being less than ten percent (10%) of the sprocket radius.

11. The star carrier roller assembly of claim 8 wherein the carrier roller includes two cylindrical wear surfaces, and each cylindrical wear surface being separated from a welded surface by a carrier roller non-contact zone; and
a width of the carrier roller non-contact zone being at least three times a fillet weld width.

12. The star carrier roller assembly of claim 9 wherein each tooth includes a tooth tip height and the sprocket includes a sprocket radius; and the tooth tip height being less than ten percent (10%) of the sprocket radius; and
two cylindrical wear surfaces of the carrier roller being separated from a welded surface by a carrier roller non-contact zone; and a width of the carrier roller non-contact zone being at least three times a width of the welded surface.

13. A method of assembling a star carrier roller assembly, comprising the steps of:
positioning a sprocket between a pair of wear surfaces on an assembled carrier roller; and
maintaining the wear surfaces on the carrier roller less than three hundred degrees Fahrenheit (300° F.) while welding the sprocket to the carrier roller.

14. The method of claim 13 wherein the step of maintaining a wear surface includes a step of maintaining at least one seal of the carrier roller less than one hundred and eighty degrees Fahrenheit (180° F.) while welding the sprocket to the carrier roller.

15. The method of claim 13 wherein the step of maintaining the wear surface includes a step of welding with a fillet weld width that is less than twenty-five percent (25%) of a thickness of the sprocket.

16. The method of claim 13 wherein the step of attaching includes a step of skip welding the sprocket to the carrier roller.

* * * * *